Figure 1:
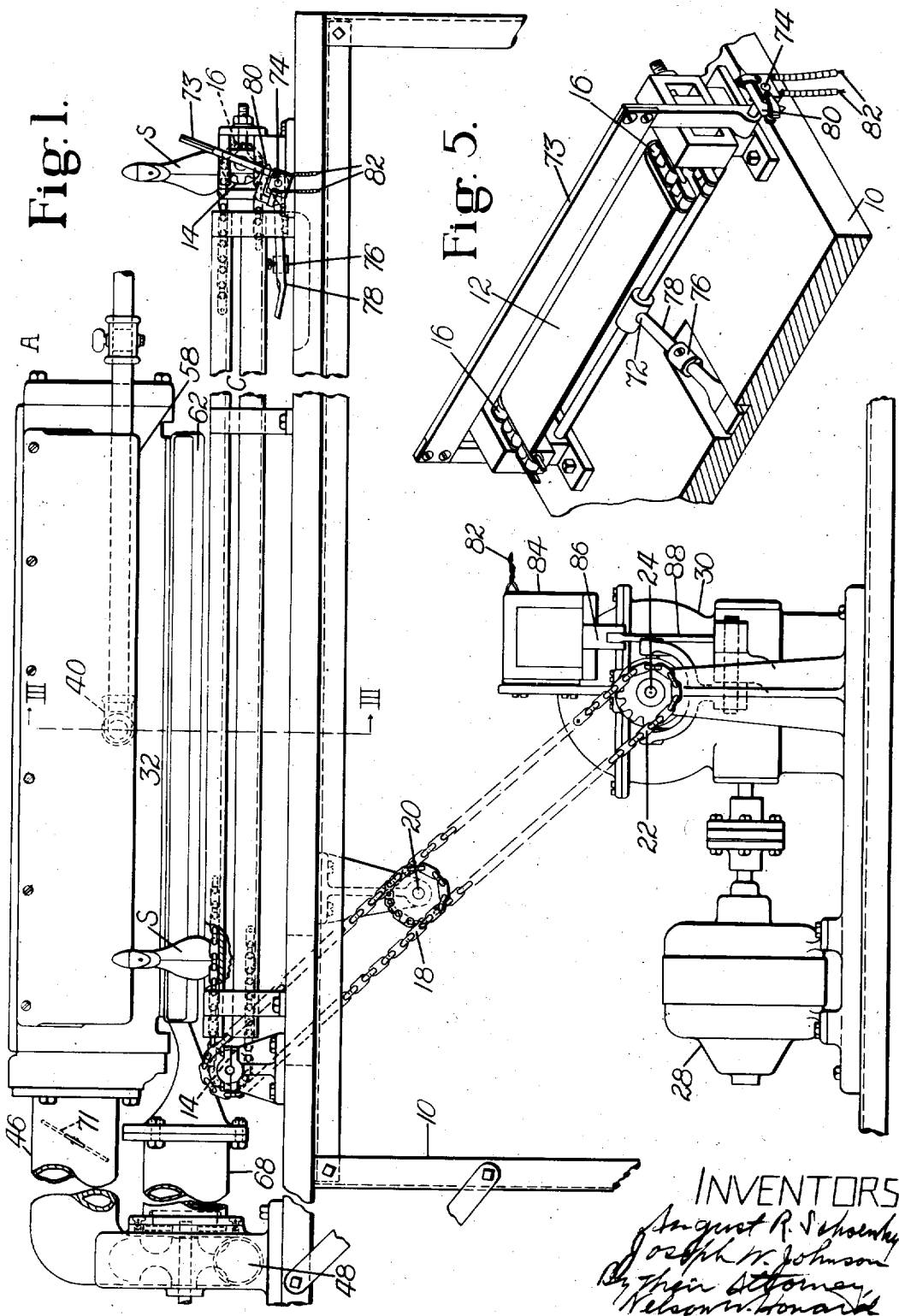

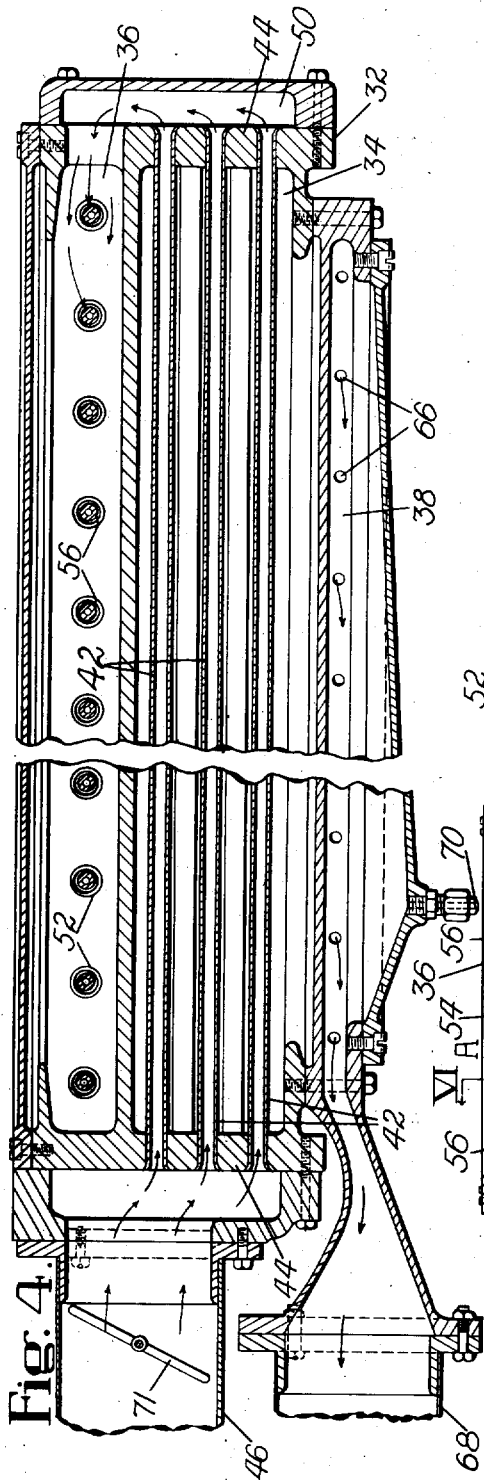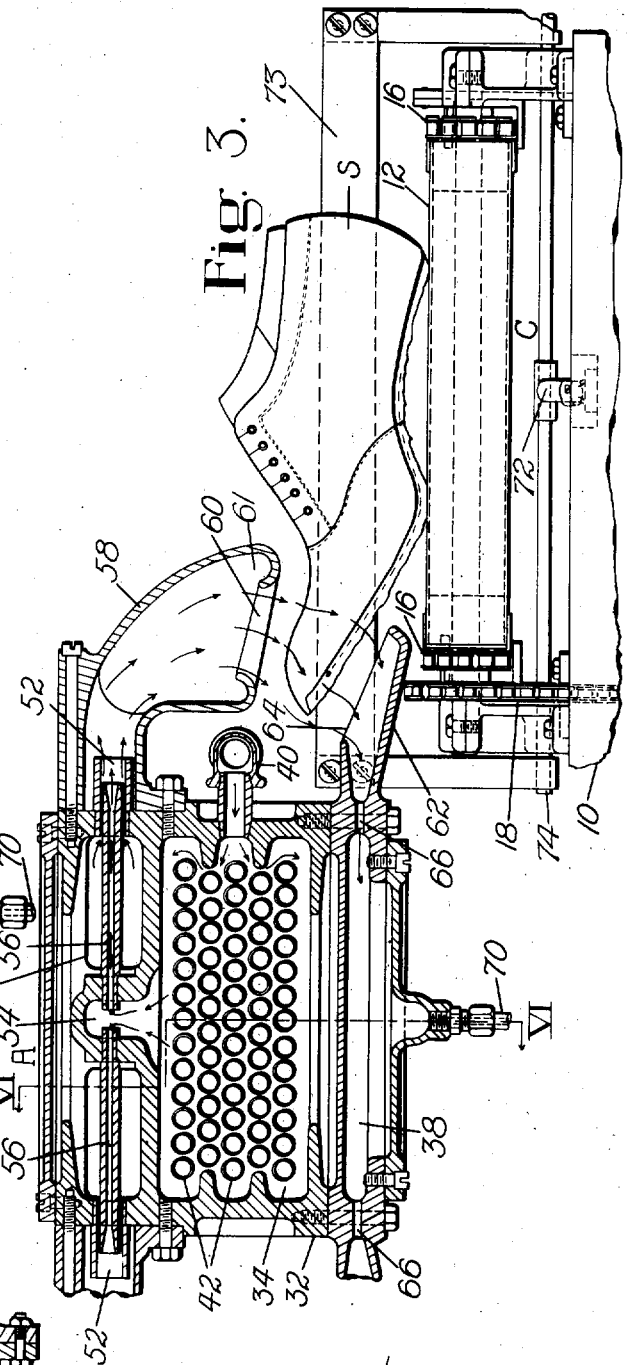

Patented Aug. 22, 1933

1,923,167

UNITED STATES PATENT OFFICE 1,923,167

SHOE TREATING APPARATUS

August R. Schoenky and Joseph W. Johnson, Beverly, Mass., assignors to United Shoe Machinery Corporation, Paterson, N. J., a Corporation of New Jersey Application September 19, 1929
Serial No. 393,797

22 Claims. (Cl. 12—1)

This invention relates to apparatus for treating shoes, being particularly concerned with the tempering of portions of said shoes, as in preparation for the lasting of the toes.

Objects of the invention are to arrange for a practically continuous supply of work from one operator or group of operators, as those doing side lasting, to another operator or operators, as toe-lasters, the shoes, during their advance from position to position, being subjected to the desired treatment and arriving at the receiving position only as they are required, the moistened air or other treating medium being conditioned and applied efficiently.

In achieving these objects, as a feature of the invention, we associate with a conveyor operating in the open air and arranged to support the shoes to be treated, a conduit provided with an opening extending along the conveyor in proximity to the shoes thereon, there being means for causing the flow of air, steam or a mixture of these media through the apparatus and in contact with the work. Thus the shoes are treated as they travel, being received upon a surface convenient for the initiating operator and presented for ready utilization to the receiving operator, the latter having the stimulus of a constant supply. The unitary means which prepares the treating medium and applies it may be common to and extend along a plurality of shoe-advancing means, being, for example, situated between parallel conveyors. Preferably, the conduit has an outlet- and an inlet-opening arranged opposite and spaced from each other to receive between them work on the conveyor, so the treating medium may be directed in a definite path with little loss, and in a manner which will best subject the shoes to its influence. The outlet-opening we have shown herein as contained in a hood extending along one edge only of the conveyor, and the inlet-opening in a trough parallel to the hood. It is to be noted, however, that the conditioning and circulating arrangement does not necessarily depend for novelty upon its use with a conveyor.

A further feature of our invention may be found in an organization by which air is moistened to supply a treating medium. Herein, a steam-chamber, provided with a discharge-outlet, has an air-conduit passing through it, said conduit thereafter receiving steam from the discharge-outlet and terminating in an outlet-opening, delivering mixed air and steam to the work. Preferably, there is employed a chest having a heating section and a mixing section. Steam is delivered to the heating section, and the air-conduit passes through said section. From the mixing section opens or extends a nozzle for the mixture, which nozzle receives steam from the heating section, this mixture being directed upon the work. It is also desirable, as has already been pointed out, to have means for drawing the mixture from the work, and for this purpose we have shown the chest as including a suction-section having exhaust-connections. By the arrangement just outlined, the steam which is to furnish the moisture is also caused to preheat the air which is to be mixed with it, thus lessening condensation at points of application to the work. By bringing together the steam and air at the nozzles, a thorough mixing effect is obtained.

To make the treated shoes available for the receiving operator only at such times as he is able to remove them from the conveyor, we furnish, as another feature of the invention, novel means for controlling the travel of the shoes under the influence of the conveyor. This means is best governed by the shoes themselves, and is herein illustrated as situated beyond the means which applies the treating medium, or where the work is removed by the receiving operator. It may consist of a movable contact device lying in the path of the shoes upon the conveyor and stopping mechanism for said conveyor under the control of the device. With such an arrangement, the shoes may be brought one by one to the receiving operator, the conveyor advancing the work only when the previously delivered piece has been taken by the operator.

Figure 2:
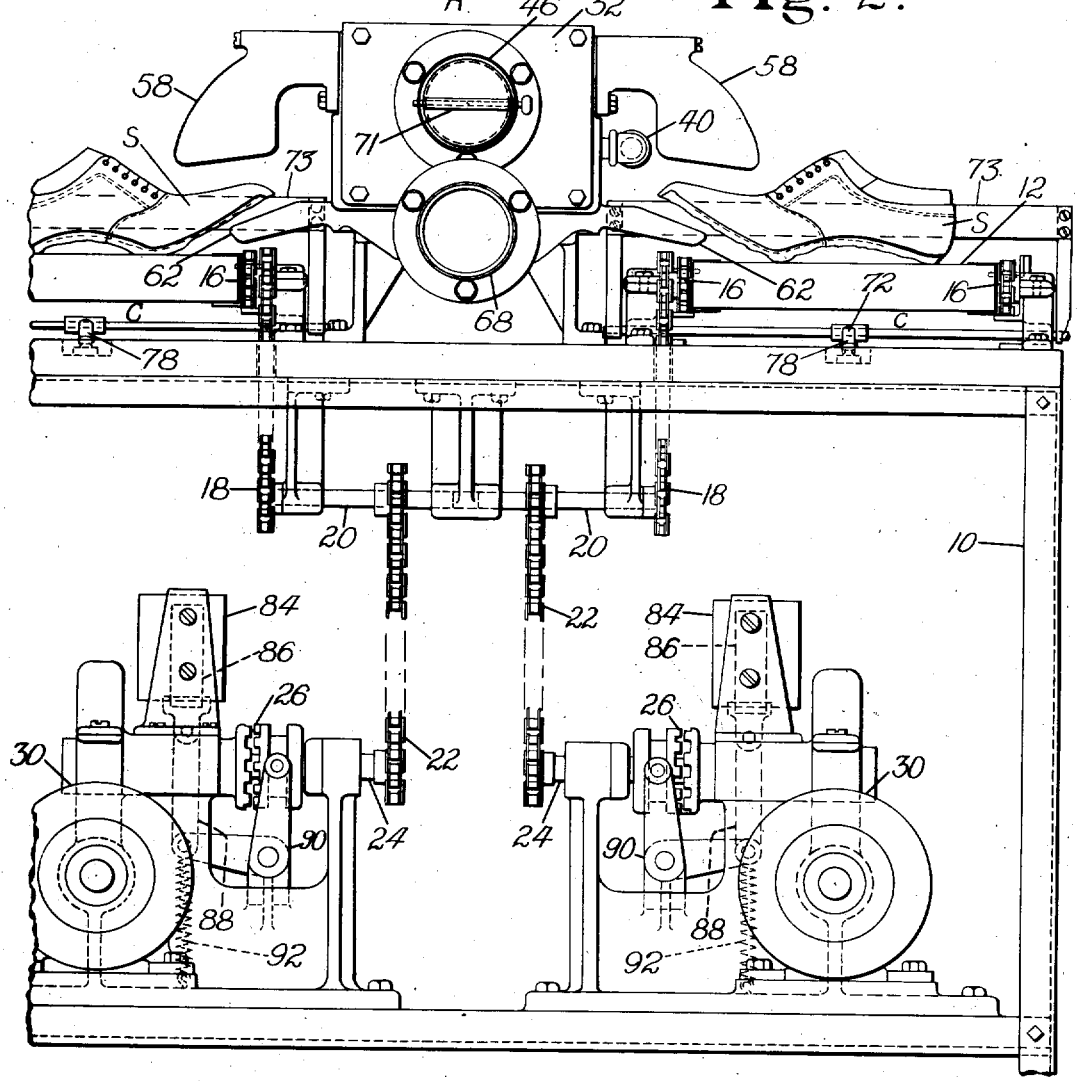

The accompanying drawings illustrate a particular embodiment of the invention,

Fig. 1 being a broken side elevation of our improved shoe-treating apparatus;

Fig. 2, a partial end elevation looking from the left in Fig. 1;

Fig. 3, an enlarged partial vertical transverse section on the line III—III of Fig. 1;

Fig. 4, a broken longitudinal section through the conditioning apparatus, taken on the line IV—IV of Fig. 3; and Fig. 5, a perspective view of the conveyor-controlling mechanism.

Supported upon a frame 10, at such a height that an operator can conveniently lay upon them work which he has completed, are one or more conveyors C. Two of these conveyors are illustrated, they being efficiently served by a single air-conditioning means A located between them. The number of conveyors, however, will depend upon the magnitude of the groups of operators who supply work to and remove it from them. Each conveyor is of the endless or belt-type, with its upper work-receiving run extending horizontally to give a supporting surface 12. The ends may be located at different operating positions, the character of the operations performed being such that, between them, the condition of the conveyed shoes or portions thereof is to be altered, as by moistening or drying. We have shown the belts as running upon rolls 14, 14, which may be joined to turn together by sprocket-gearing 16, 16. To the chains of this gearing the opposite edges of the belt may be connected, the surface 12 being thus maintained more nearly plane, so the shoes, throughout its length, will be similarly and stably positioned. At one extremity of each conveyor, its roll 14 is connected by sprocket-gearing 18 to a counter-shaft 20, this, in turn, being joined by sprocket-gearing 22 to a driving shaft 24, which is sectional and includes a clutch 26. The shaft 24 receives power from a motor 28 through reducing gearing enclosed in a casing 30. Such a driving mechanism is shown for each conveyor.

In the present instance, the conditioning means A, which is to supply heated and moistened air, or air mixed with steam to temper the work placed by the initiating operators upon the two conveyors C, is symmetrically disposed between said conveyors. This conditioning portion of the apparatus may comprise a chest 32 carried upon the frame just above the level of the conveyor-surface 12 and extending along said surface for a sufficient distance to give the necessary treatment to the supported shoes. The chest has three longitudinally extending sections, one above another; see Figs. 3 and 4 of the drawings. At the vertical center is a section 34, in which introduced air is given a preliminary heating by steam. Above the section 34 is a second section 36, in which the heated air and steam are mixed, and from which the mixture is discharged upon the work. To a third section 38, at the bottom of the chest, an exhaust is applied, which acts upon the discharge from the mixing section to direct it over and carry it away from the work. The section 34 contains a chamber supplied with steam by a pipe 40. Through the chamber, surrounded by the contained steam, pass closely placed longitudinal pipes 42 secured by tight joints in openings in opposite heads 44. A duct 46 supplies air to one extremity of these pipes from some such source as the outlet of a fan 48 (Fig. 1). The air, thus heated by the steam, flows up through a passage 50 into the section 36 and escapes through peripheral portions of compound discharge-nozzles 52. These nozzles, for the double-conveyor arrangement, are situated in series at opposite sides of the chest. The chamber 34 has at its top and center a dome 54, into which the steam rises and from which it flows through opposite series of pipes 56, 56, to be discharged axially by the nozzles 52, being there mixed with the air. The aspirating effect of the air renders it unnecessary to supply the steam under any material pressure. The mixture from the nozzles at each side of the chest enters a delivery device, shown as a hood 58 overhanging one edge of the adjacent conveyor C and having an outlet-opening 60 extending substantially the full length of the chest 32. The illustrated embodiment of the invention is designed to temper the toe-portions of shoes appearing at S. The opening 60 is therefore of such dimensions and is so inclined as to deliver the tempering medium over the desired area and, if its temperature is sufficiently high to render this desirable, at a distance therefrom which will give the proper moistening effect without overheating. A gutter 61 is shown about the hood, to receive and conduct away the water of condensation.

Taken alone, the delivery of the treating medium, as just described, may not be wholly effective on account of the tendency of the mixture to escape laterally without the necessary contact with the work. This we prevent by associating with the delivery device a suction device consisting of a trough 62 extending at each side of the chest just above the edge of the corresponding conveyor C and having an elongated inlet-opening 64 spaced sufficiently from the opening 60 to admit between them the toes of the shoes S. The openings 64 may be inclined to generally conform to the under side of the toe-portions. Each trough 62 is connected by a series of passages 66 with the chest-section 38, to one extremity of which an exhaust is applied, as by a duct 68 leading to the eye of the fan 48. Thus there is created through each inlet-opening 64 a suction which draws to it the mixture delivered by the outlet-opening 60, directing the tempering medium over and causing it to evelope with little loss the surfaces which it is to affect. A drain-pipe 70, for the removal of condensed steam, appears joined to the bottom of the suction-section 38, and similar connections may be made at other points in the apparatus.

To summarize the general operation of the apparatus as thus far traced, it may be assumed that side-lasting operators are grouped at the outgoing end of a conveyor C and toe-lasting operators at the incoming end, and that between these operators it is desired to temper the toe-portions of the shoes operated upon to facilitate their lasting. Each side-laster is so situated that, as he removes a shoe from his machine, the supporting surface 12 of a conveyor C is conveniently located for him to place said shoe bottom-down upon the surface, thrusting the toe into the space between the outlet-opening 60 of the hood 58 and the inlet-opening 64 of the trough 62. The successive shoes thus placed are moved gradually by the conveyor along the openings. From the opening 60, vapor is delivered about the toes of the entire series of shoes along the apparatus A to produce the tempering action. The vapor consists of air heated by steam in the chest-section 34 and mixed, at the nozzles 52 of the section 36, with the steam which effected the heating, without material loss of moisture by condensation. This tempering medium is directed closely about the work and prevented from escaping laterally between the hood and trough by the suction through the opening 64 and the chest-section 38. When the shoes emerge from the treatment-area, they will have taken up the necessary amount of moisture, this being determined by the length of the portion A, the rate of travel of the conveyor and the character of the tempering mixture supplied. The last-mentioned factor may be governed by some such means as a damper 71 in the duct 46, this varying the amount of air circulated. It is to be observed that there is formed within the apparatus a conduit extending from and back to the fan 48 and including the duct 46, heating pipes 42, passage 50, chest-section 36, nozzles 52, hoods 58, troughs 62, passages 66, chest-section 38 and duct 68, the continuity of this conduit being broken only by the space between the outlet-opening 60 and the inlet-opening 64, where the work is presented to the treating medium, and the condition of the air being modified by the steam introduced into the conduit at the nozzles.

Were the delivery of the treated work at the incoming ends of the conveyors determined independently of the needs of the receiving operators or were it always continuous, it might at times arrive so rapidly that it would not be taken from the conveyors before the travel thereof carried it over the ends. Inconvenience to the operators and possible mutilation of the tempered upper-material would be caused. To avoid this, we control the movement of each conveyor so that each shoe remins at the delivery-point until an operator removes it, the shoe itself effecting this control. Projecting into the path of the work at the delivery-end of the conveyor, beyond the apparatus A, is a contact member consisting of the arm 73 of a lever 72 fulcrumed at 74 upon the frame. The contact-portion of the lever extends across the conveyor and is held normally raised by a weight 76 adjustable upon an arm 78. Mounted upon the lever 72 is a circuit-controlling device 80. This may be one of the well-known mercury-switches, in which the movement of mercury in a tilting tube connects or disconnects the terminals of an electric circuit. A portion of such a circuit appears at 82, and would include a source of electrical current, this not being illustrated. Also included in the circuit is a winding of some such electromagnetic device as a solenoid 84, the core or plunger 86 of which is joined by a link 88 to a lever 90 having an arm acting upon the movable member of the corresponding clutch 26. A spring 92, joined to the lever, holds the clutch-portions normally engaged. As long as the arriving work is removed from the conveyor before reaching the lever 72, the circuit 82 is open at the switch 80, the solenoid 84 is de-energized, the portions of the clutch 26 drawn together by the spring 92, and the travel of the conveyor continues. If, however, the work reaches the delivery-end of the conveyor more rapidly than it can be disposed of by the operators, it strikes the arm 73 of the stopping mechanism, tilting the switch 80 to close the circuit. This sends current through the solenoid, disconnecting the clutch and automatically stopping the advance of the conveyor, as is shown in Figs. 1 and 2. This condition is maintained until the shoe which caused the operation of the stopping mechanism is removed, whereupon the arm 73 returns to its normal position, current is cut off the solenoid and the clutch is re-engaged to again apply the driving force to the conveyor.

Having described our invention, what we claim as new and desire to secure by Letters Patent of the United States is:

1. In an apparatus for treating portions of shoes, a conveyor operating in the open air and arranged to support the shoes to be treated, a conduit provided with an opening extending along the conveyor in proximity to the shoes thereon, and means for causing the flow of a treating medium through the opening and in contact with the shoes upon the conveyor.

2. In an apparatus for treating portions of shoes, an endless conveyor arranged to support the shoes to be treated, means for operating the conveyor to normally advance said shoes continuously, a conduit having a terminal portion extending along one edge of the conveyor and being provided with an elongated opening parallel to said edge, and means for causing the flow of a treating medium through the opening and about portions of the work arranged in a series upon the conveyor.

3. In an apparatus for treating portions of shoes, a conveyor arranged to support the shoes to be treated, a conduit provided with an outlet-opening and an inlet-opening extending along the conveyor and spaced to receive between them portions of shoes upon the conveyor, and means for circulating a treating medium through the conduit and across the shoes.

4. In an apparatus for treating portions of shoes, a conveyor arranged to support the shoes to be treated, a conduit provided with an outlet-opening and an inlet-opening extending along the conveyor and spaced to receive between them portions of shoes upon the conveyor, and means for delivering air through the outlet-opening and creating a suction through the inlet-opening.

5. In an apparatus for treating portions of shoes, a conveyor arranged to support the shoes to be treated, a hood extending along one edge only of the conveyor, and means for causing the flow of a treating medium through the hood above the conveyor and about the shoes.

6. In an apparatus for treating portions of shoes, a conveyor arranged to support the shoes to be treated, a conduit provided with a hood and a trough extending parallel to each other along one edge only of the conveyor, and means for causing the flow of a treating medium through the hood about the shoes and into the trough.

7. In an apparatus for treating portions of shoes, a conveyor operating in the open air and arranged to support the shoes to be treated, a conduit provided with an opening extending along the conveyor in proximity to the shoes thereon, and means for causing the flow of moist air through the opening in contact with the shoes upon the conveyor.

8. In an apparatus for treating portions of shoes, a conveyor arranged to support the shoes to be treated, a conduit provided with an outlet-opening and an inlet-opening extending along the conveyor and spaced to receive between them portions of shoes upon the conveyor, means for circulating air through the conduit and across the shoes, and means for introducing steam into the air-current.

9. In an apparatus for treating portions of shoes, a conveyor arranged to support the shoes to be treated, a hood extending above one edge of the conveyor, a trough lying substantially parallel to and below the hood in proximity to the conveyor, there being a space between the hood and trough to admit the toes of shoes supported upon the conveyor, and means for delivering moist air through the hood about the toes of the shoes and for withdrawing it through the trough.

10. In a shoe-moistening apparatus, a plurality of means for advancing shoes for moistening, and unitary means common to and extending along the plural advancing means for mixing air and steam and delivering the mixture to the advancing shoes.

11. In a shoe-moistening apparatus, parallel conveyors arranged to support shoes to be moistened, and unitary air-and-steam-mixing means situated between the conveyors and having outlets delivering to the shoes upon both conveyors.

12. In a shoe-moistening apparatus, a plurality of means for advancing shoes for moistening, and unitary means common to the plural advancing means and extending continuously along them for mixing air and steam and delivering the mixture to the advancing shoes and for withdrawing said mixture.

13. In a shoe-moistening apparatus, parallel conveyors arranged to support shoes to be moistened, and unitary air-and-steam-mixing and suction means situated between the conveyors and having outlets delivering to the shoes upon both conveyors and inlets withdrawing the mixture from said shoes.

14. In a shoe-treating apparatus, a conduit having a delivery-opening and a suction-opening arranged directly opposite each other and spaced only sufficiently to receive the toe-portion of a shoe between them, and means for creating a circulation of air through the delivery-opening about the interposed toe of the shoe and directly therefrom into the suction-opening, the remainder of the shoe being removed from the effect of the circulating air.

15. In a shoe-moistening apparatus, a steam-chamber having a discharge-outlet, and an air-conduit passing through the chamber and thereafter receiving steam from the discharge-outlet and having an outlet delivering mixed air and steam to the work.

16. In a shoe-moistening apparatus, a steam-chamber having a discharge-outlet, an air-conduit passing through the chamber and co-operating with the discharge-outlet and having an outlet delivering mixed air and steam to the work, and suction means having an inlet spaced from the delivery-outlet to receive the work between them.

17. In a shoe-moistening apparatus, a chest having a heating section and a mixing section, means for delivering steam to the heating section, an air-conduit passing through the heating section and discharging into the mixing section, a nozzle opening from the mixing section, connections for delivering steam from the heating section to the nozzle, and means for directing the mixture from the nozzle upon the work.

18. In a shoe-moistening apparatus, a chest having a heating section and a mixing section, means for delivering steam to the heating section, an air-conduit passing through the heating section and discharging into the mixing section, a nozzle opening from the mixing section, connections for delivering steam from the heating section to the nozzle, means for directing the mixture from the nozzle upon the work, and suction means for drawing the mixture from the work.

19. In a shoe-moistening apparatus, a chest having a heating section, a mixing section and a suction-section, means for delivering steam to the heating section, an air-conduit passing through the heating section and discharging into the mixing section, a nozzle opening from the mixing section, connections for delivering steam from the heating section to the nozzle, exhaust-connections to the suction-section, means for directing the mixture upon the work, and means for admitting the mixture to the suction-section.

20. In an apparatus for treating shoes, a conveyor for the shoes adapted to present individual shoes to a treating medium, means for applying said treating medium to the shoes upon the conveyor, and automatic means for controlling the travel of the shoes under the influence of the conveyor, such controlling means having a member with which the shoes successively contact while still affected by their treatment in the apparatus.

21. In an apparatus for treating shoes, a conveyor for the shoes, means extending along the conveyor at one side only thereof for applying a treating medium to the shoes thereon, and means associated with the conveyor beyond the applying means and governed by the treated shoes for controlling the travel of said conveyor.

22. In an apparatus for treating shoes, a conveyor for the shoes, a conduit provided with an opening extending along the conveyor, means for causing a flow of moist air through the opening upon limited portions of the shoes on the conveyor, and stopping means for the conveyor associated therewith and governed by the treated shoes.

AUGUST R. SCHOENKY.
JOSEPH W. JOHNSON.